(12) United States Patent
Ramaley et al.

(10) Patent No.: US 10,079,869 B2
(45) Date of Patent: *Sep. 18, 2018

(54) METHOD AND SYSTEM FOR MANAGING AND DISTRIBUTING DIGITAL MEDIA

(71) Applicant: Comcast Cable Communications Management, LLC, Philadelphia, PA (US)

(72) Inventors: Alan Ramaley, Seattle, WA (US); Andrew Sodt, Seattle, WA (US); Rahul Sonnad, Snohomish, WA (US); Ian Blaine, Seattle, WA (US); Andrew Olson, Kirkland, WA (US)

(73) Assignee: Comcast Cable Communications Management, LLC, Philadelphia, PA (US)

(*) Notice: Subject to any disclaimer, the term of this patent is extended or adjusted under 35 U.S.C. 154(b) by 644 days.

This patent is subject to a terminal disclaimer.

(21) Appl. No.: 14/334,744

(22) Filed: Jul. 18, 2014

(65) Prior Publication Data

US 2015/0052434 A1 Feb. 19, 2015

Related U.S. Application Data

(63) Continuation of application No. 11/499,768, filed on Aug. 7, 2006, now Pat. No. 8,812,672, which is a (Continued)

(51) Int. Cl.
*G06F 15/173* (2006.01)
*H04L 29/06* (2006.01)
(Continued)

(52) U.S. Cl.
CPC ............ *H04L 65/60* (2013.01); *G06F 3/0481* (2013.01); *G06F 3/04842* (2013.01);
(Continued)

(58) Field of Classification Search
CPC .............................. H04L 65/60; G06F 3/0481
(Continued)

(56) References Cited

U.S. PATENT DOCUMENTS 5,778,187 A 7/1998 Monteiro et al.
5,841,980 A 11/1998 Waters et al.
(Continued)

FOREIGN PATENT DOCUMENTS

| EP | 0575279 A2 | 12/1993 |
|----|----|----|
| WO | 0122725 A1 | 3/2001 |
| WO | 0219701 A1 | 3/2002 |

OTHER PUBLICATIONS

Mears, Jennifer, "Akamai, Reliacast Partner to Manage Streaming Content", Network World, Jul. 30, 2001, Available at http://www.networkworld.com/archive/2001/123362_Jul. 30, 2001.html, 2 pages.
(Continued)

*Primary Examiner* — Duyen Doan
(74) *Attorney, Agent, or Firm* — Banner & Witcoff, Ltd.

(57) ABSTRACT

A system and method that integrates a plurality of media service systems offering different multimedia services such as media storage, syndication, delivery, and billing services. The system and method also provides automated file transcoding. In embodiment, a method of the present invention includes receiving a plurality of physical media files, organizing the plurality of physical media files so that different bit-rates and formats of a single source material are organized into a media database entity, receiving user specified delivery settings for the distribution of the physical media file, generating a release database entity storing the delivery settings of the physical media file, generating an address indicating the storage location of the release, and transmitting the address to a remote computing device.

23 Claims, 14 Drawing Sheets

Related U.S. Application Data continuation of application No. 09/898,430, filed on Jul. 2, 2001, now Pat. No. 7,089,309.

(60) Provisional application No. 60/277,813, filed on Mar. 21, 2001.

(51) Int. Cl.
*G06F 3/0481* (2013.01)
*G06F 3/0484* (2013.01)
*H04L 29/08* (2006.01)

(52) U.S. Cl.
CPC .... *H04L 29/06027* (2013.01); *H04L 67/2823* (2013.01); *H04L 69/329* (2013.01)

(58) Field of Classification Search
USPC ........................................ 709/226, 203, 231
See application file for complete search history.

(56) References Cited

U.S. PATENT DOCUMENTS

| | | | |
|---|---|---|---|
| 5,881,234 A * | 3/1999 | Schwob | H04L 12/14 709/219 |
| 5,918,013 A | 6/1999 | Mighdoll et al. | |
| 6,151,632 A | 11/2000 | Chaddha et al. | |
| 6,202,061 B1 | 3/2001 | Khosla et al. | |
| 6,308,208 B1 | 10/2001 | Jung et al. | |
| 6,336,138 B1 | 1/2002 | Caswell et al. | |
| 6,370,571 B1 | 4/2002 | Medin, Jr. | |
| 6,396,845 B1 | 5/2002 | Sugita | |
| 6,407,680 B1 | 6/2002 | Lai et al. | |
| 6,480,961 B2 | 11/2002 | Rajasekharan et al. | |
| 6,505,254 B1 | 1/2003 | Johnson et al. | |
| 6,517,587 B2 | 2/2003 | Satyavolu et al. | |
| 6,529,146 B1 | 3/2003 | Kowalski et al. | |
| 6,570,974 B1 | 5/2003 | Gerszberg et al. | |
| 6,678,731 B1 * | 1/2004 | Howard | G06F 21/31 709/225 |
| 6,714,921 B2 | 3/2004 | Stefik et al. | |
| 6,721,741 B1 | 4/2004 | Eyal et al. | |
| 6,751,673 B2 | 6/2004 | Shaw | |
| 6,754,699 B2 | 6/2004 | Swildens et al. | |
| 6,807,580 B2 | 10/2004 | Freeman et al. | |
| 6,882,793 B1 | 4/2005 | Fu et al. | |
| 6,928,463 B1 | 8/2005 | Tene et al. | |
| 6,963,910 B1 * | 11/2005 | Belknap | G06F 9/4443 348/E5.008 |
| 7,051,275 B2 | 5/2006 | Gupta et al. | |
| 7,069,310 B1 | 6/2006 | Bartholomew | |
| 7,089,309 B2 | 8/2006 | Ramaley et al. | |
| 7,093,019 B1 * | 8/2006 | Bertani | H04L 63/08 709/203 |
| 7,114,174 B1 | 9/2006 | Brooks et al. | |
| 7,263,497 B1 | 8/2007 | Wiser et al. | |
| 7,308,462 B1 | 12/2007 | Clarkson et al. | |
| 7,330,875 B1 | 2/2008 | Parasnis et al. | |
| 2001/0009014 A1 | 7/2001 | Savage et al. | |
| 2001/0027491 A1 | 10/2001 | Terretta et al. | |
| 2001/0027493 A1 | 10/2001 | Wallace | |
| 2001/0049728 A1 | 12/2001 | Kang | |
| 2002/0049912 A1 | 4/2002 | Honjo et al. | |
| 2002/0056123 A1 | 5/2002 | Liwerant et al. | |
| 2002/0087642 A1 * | 7/2002 | Wei | H04L 29/06027 709/206 |
| 2002/0091760 A1 | 7/2002 | Rozen | |
| 2002/0116716 A1 | 8/2002 | Sideman | |
| 2002/0120867 A1 * | 8/2002 | Mitchell | H04L 63/0815 726/7 |
| 2002/0120939 A1 | 8/2002 | Wall et al. | |

OTHER PUBLICATIONS

De Lancie, Philip, "Getting to Know You: Reliacast Puts the Audience into Content Management", EContentmag.com, Nov. 1, 2001, Available at http://www.ecmag.net/Articles/ArticlePrint.aspx?ArticleID=1040&IssueID=110, 3 pages.

* cited by examiner

401 PEMI-1-17297

| File ID | Release ID | Media ID | Transfer Setting | File Type |
|---------|------------|----------|------------------|-----------|
| 2343 | 123549 | 2000 | 64K | WM |
| 2344 | 123550 | 2000 | 128K | WM |
| 2345 | 123551 | 2000 | 256K | WM |
| .... | .... | .... | .... | .... |
| .... | .... | .... | .... | .... |
| | | | | _Release Table_ |

| Media ID | File ID | CDN | File Location |
|----------|---------|-----|---------------|
| 2000 | 2343 | Yes | http://serviceprovider.com/324897473455 |
| 2000 | 2344 | Yes | http://serviceprovider.com/clientfiles/343243 |
| 2000 | 2345 | No | /usr/local/mediafiles/3490498 |
| | | | |
| | | | _Physical Media Table_ |

METHOD AND SYSTEM FOR MANAGING AND DISTRIBUTING DIGITAL MEDIA

CROSS-REFERENCE TO RELATED APPLICATIONS

This application is a continuation of U.S. patent application Ser. No. 11/499,768, filed Aug. 7, 2006, which is a continuation of U.S. patent application Ser. No. 09/898,430, filed Jul. 2, 2001 (issued as U.S. Pat. No. 7,089,309), which claims the benefit under 35 U.S.C. § 119(e) of U.S. Provisional Application No. 60/277,813, filed on Mar. 21, 2001, and titled "SYSTEM AND METHOD FOR MANAGING AND DISTRIBUTING STREAMING VIDEO," the subject matter of which is expressly incorporated by reference herein.

FIELD OF THE INVENTION

The present invention relates to computer systems, and in particular, the present invention relates to a method and system for integrating a plurality of media service computer systems.

BACKGROUND OF THE INVENTION

In recent years, there has been a tremendous growth in the use of multimedia applications on the World Wide Web ("Web"). New developments in multimedia applications have greatly enhanced the quality of viewing experiences for users of the Web, as many now have access to multimedia applications that provide real-time video streams, audio streams, video-on-demand, video and audio downloads, and many other functions. To meet the demand for new multimedia applications, many Web-based multimedia services have been developed. Examples of some existing multimedia services include media storage, streaming, syndication, delivery, transcoding, tracking, and billing services. These multimedia services allow many publishers, content owners, and other content providers to store large banks of digital media, provide real-time video and audio streams to client computers, and carry out many functions to serve and manage multimedia systems.

There are many known service providers that offer the above-described multimedia services. As can be appreciated by one skilled in the art, it is common for each service provider to specialize in a specific group of services. In certain instances, a service provider may be equipped to only provide one type of service because the various multimedia services require particular computing equipment to facilitate each service. For example, a first service provider may be limited to providing storage and video streaming services, while a second service provider may be limited to providing transcoding services.

While existing systems are effective for providing their respective multimedia service, there are several disadvantages. In particular, it is difficult for content owners and multimedia publishers to readily combine and integrate the multimedia services provided by each service provider. In one illustrative example, if a multimedia publisher such as CNN Interactive desires to publish a video file on a Web site, several service providers must be utilized to implement all of the desired multimedia services that may be needed to publish the video file. For instance, in enabling a Web server to offer a streaming video feed to the public, the publisher may first need to select Anystream® to encode video content into digital media formats commonly used on the Internet such as RealMedia® and Windows Media Technologies®. CNN Interactive would then need to select StorageNetworks™ to provide offsite storage for its digital media files, Akamai™ for the streaming and download services, Zebus Group, Inc. for digital video advertising services and Generic Media® for transcoding services. This coordination between the plurality of service providers creates difficulty and expense, as multimedia publishers are required to select and coordinate compatible services. To date, no automated system exists for multimedia publishers to create, manage and distribute digital media files. In addition, since multimedia files are sizable, sometimes ranging up to 50 to 100 MB, the management of the files between the computing systems associated with each service provider presents many logistical complications.

In existing systems, the difficulty in coordinating and transferring multimedia files between each service provider is exacerbated by the fact that multimedia publishers are generally required to generate and transfer several media files for each publication. As can be appreciated by one of ordinary skill in the art, most existing multimedia Web servers provide users with an option to view streaming video by the use of different media players, such as Real Player and Windows Media Player®, while allowing the user to choose between a video stream at 300, 150, or 75 kilobits a second (also known as the bit-rate). The files to accommodate these options are produced through a process known as encoding, in which a video signal is captured and converted to an uncompressed digital format and becomes the master media file. The master media file is then encoded to a compressed format such as RealMedia® or Windows Media®. Thus, to offer a single master media file in two formats and three bit-rates requires the encoding process to generate six individual digital media file. As between the multimedia publisher and the encoding service provider, the encoding process is manual. The multimedia publisher must provide the source material (e.g. video tape) to the encoding service provider who then performs the encoding and returns the digital media files to the publisher. The management of all files related to one publication is a difficult task given that it is challenging to maintain the relationship between each derivative file and the corresponding master media file. This complex task creates an opportunity for inaccurate file management, thereby creating incorrect cross-references and lost files.

Even if a multimedia publisher successfully creates and manages all of the files that must be generated from a master media file, additional challenges arise when the encoding formats change or are upgraded. For example, the current versions of the most popular formats are RealMedia 8® and Windows Media 7®. These formats may be upgraded once or even twice a year, forcing a multimedia publisher to go through the process of manually encoding even more media files from the master media file. Encoding from an uncompressed master media file occurs in real-time and is therefore time consuming and expensive. Consequently, many multimedia publishers will generate digital media files in the latest formats through a process known as transcoding. Transcoding differs from first generation encoding in that the transcoder does not work from an uncompressed file, but instead generates the new digital media files from previously compressed files. Like encoding, transcoding is mainly a manual process.

SUMMARY OF THE INVENTION

The present invention provides a system and method for managing and distributing digital media between a plurality of service providers offering different multimedia services. More specifically, the system and method of the present invention manages and tracks the transfer of a voluminous quantity of sizable multimedia files between multimedia computing systems associated with different service providers. According to one aspect of the invention, the system and method integrates existing multimedia systems providing services such as media storage, syndication, delivery, and billing services. The system and method of the present invention also provides other novel media services such as automated file transcoding.

In, one embodiment, the system comprises a networked computer environment having a plurality of client computers, a managing server, a media source server, and a plurality of media service computing systems. The managing server comprises a media database for storing, tracking, converting and distributing a plurality of digital media files. The managing server is operable to electronically communicate with the plurality of client computers, media service computing systems and the media source server for receiving, transferring, transmitting, and tracking digital media between each of the computing devices of the networked computer environment.

In one illustrative example, a method of the present invention includes: receiving a physical media file, organizing physical media files so that different bit-rates and formats of the same source material are organized into a media database entity, receiving user specified delivery settings for the distribution of the physical media file, generating a Release database entity, thereby relating the delivery settings to the physical media file, generating an address indicating the location of the Release, and transmitting the address to a remote computing device.

In another illustrative example, another method of the present invention includes: receiving a request for a Release, dynamically determining if any physical media file for the media satisfies the delivery settings for the Release, and determining the location of the physical media file by the use of a media database. The media database architecture includes a logical data model providing a formatted library of classifications of the media, physical media files, and Release objects for the received media files. The media database facilitates the integration of media services and the collection of data associated with the use of each media file.

In another aspect of the invention, an automated transcoding method is provided. In one embodiment implemented on a computing device, the method includes receiving a master physical media file having a first bit-rate, determining a number of physical media files that can be derived from the master media file, creating a derivative physical media file from an existing physical media file if existing physical files do not satisfy the delivery settings of a Release, storing the derivative file in a media database, and distributing the derivative file to at least one media service computing system.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 9B is an illustrative example of a Release Table in accordance with one aspect of the present invention; and FIG. 9C is an illustrative example of a physical Media Table in accordance with one aspect of the present invention;

DETAILED DESCRIPTION OF THE PREFERRED EMBODIMENT

The present invention provides a system and method for managing and distributing digital media between a plurality of service providers offering different multimedia services. According to one aspect of the invention, the system and method integrates existing multimedia systems providing services such as media storage, syndication, delivery, and billing services. The system and method of the present invention also provides other novel media services such as automated file transcoding.

According to one illustrative example, a publisher or media owner may publish one media file by uploading the media file to a managing server. Upon receipt of the media file, the managing server automatically stores the media file. In one method, the server may distribute the received media file to a plurality of remote computing devices depending on the multimedia service requested by the user. This automated distribution process allows a user to utilize a number of service providers without the need to produce, distribute and track a plurality of media files for each media. The system is configured to allow the content provider to monitor and control the distribution of the media by the use of a single graphical user interface. In addition, the system of the present invention allows users of client computers to readily access, receive and view the published media via a centralized server.

The following summary of the present invention first provides an overview of one suitable computing environment in which the invention may be implemented. The summary then provides a general description of a graphical user interface used in the operation of the system and method of the present invention. Lastly, the following summary provides an illustrative example of one implementation of the database structures and methods of the present invention.

Figure 1:
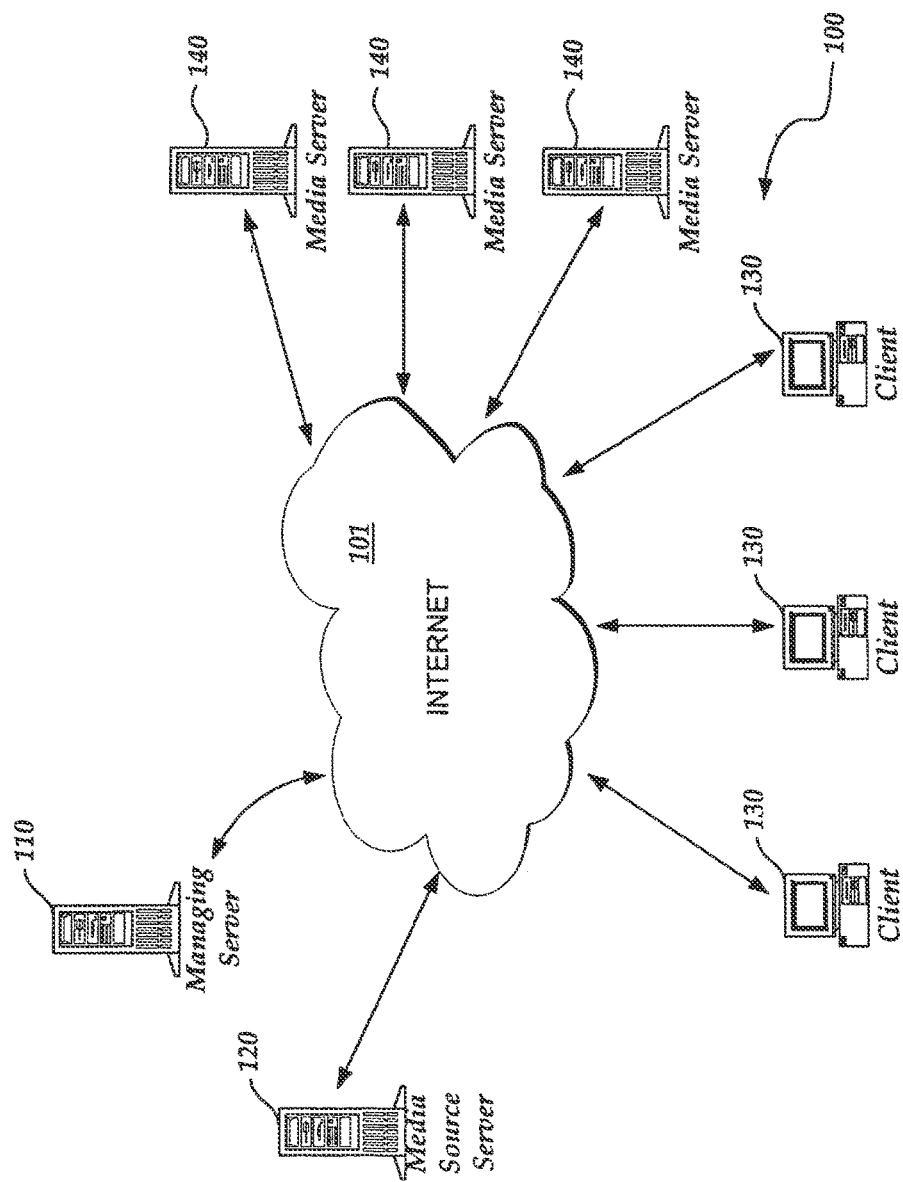
FIG. 1 is a block diagram of a computing environment in which the present invention functions according to one embodiment of the present invention.

Referring now to FIG. 1, the following discussion is intended to provide an exemplary overview of one suitable computing environment 100 in which the invention may be implemented. Generally described, the computing environment 100 comprises a plurality of client computers 130, a media source server 120, a managing server 110, and a plurality of media servers 140. Each computing device depicted in FIG. 1 is configured to electronically communicate via a network, such as the Internet 101. In addition, the managing server 110 and the media servers 140 may be in a configuration that is controlled by one or more business entities and thus also configured to electronically communicate via a Local Area Network ("LAN"). It should be appreciated that the illustrative embodiment shown in FIG. 1 is one suitable computing environment for the present invention and that methods described below may be implemented in any computing environment. For instance, the computing environment 100 of FIG. 1 may be configured on an Intranet, thereby limiting the computing devices to a dosed system. Each computing device 110-140 will be described in greater detail below with reference to FIG. 2.

As known to one of ordinary skill in the art, the term "Internet" refers to a collection of networks and routers that use the Internet protocol ("IP") to communicate with one another. As known to one having ordinary skill in the art, the Internet 101 generally comprises a plurality of LANs and Wide Area Networks ("WANs") that are interconnected by routers. Routers are special purpose computers used to interface one LAN or WAN to another. Communication links within the LANs may be twisted pair wire, or coaxial cable, while communications links between WANs may be optical links. Also known in the art, the "Web" has a vast collection of computing devices configured to distribute media and text documents via the Internet 101.

Figure 2:
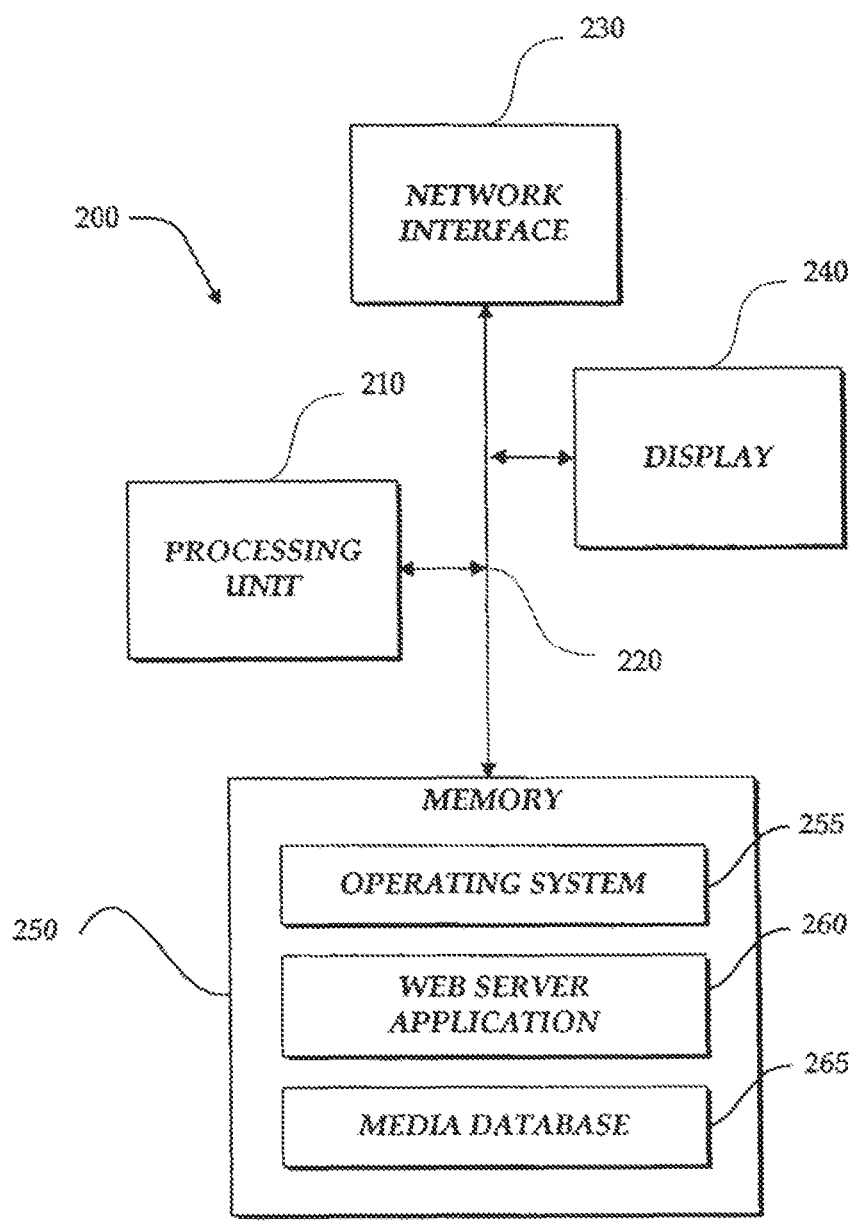
FIG. 2 is a block diagram of one computing device of the computing environment of FIG. 1 for implementing the method of the present invention.

Referring now to FIG. 2, an illustrative computing architecture 200 for implementing one of the computing devices 110-140 in accordance to one embodiment will be described. Those of ordinary skill in the art will appreciate that the computing devices of FIG. 1 may include many more components than those shown in FIG. 2. However, it is not necessary that all of these generally conventional components be shown in order to disclose an illustrative embodiment for practicing the present invention. As shown in FIG. 2, the computing devices utilized in the implementation of the present invention include a network interface 230 for electronic communication with a network, such as the Internet 101.

Each computing device depicted in FIG. 1 also includes a processing unit 210, a display unit 240, and memory 250. The memory 250 generally comprises a random access memory ("RAM"), a read-only memory ("ROM"), and a permanent mass storage device, such as a hard drive. The memory 250 stores the program code necessary for operating the hardware components of the computing device, such as an operating system 255. In addition, the memory 250 of the servers 110, 120 and 140 each stores other applications such as a Web server 260 application. The memory 250 of each client computer 130 stores a Web browser application, such as NETSCAPE NAVIGATOR® or MICROSOFT INTERNET EXPLORER®, and a media player application, such as the MICROSOFT WINDOWS MEDIA PLAYER®. The Web server application 260 and each Web browser and media player application are configured for communication of hypertext documents, media streams, and file transfers.

To facilitate one implementation of the present invention, the managing server 110 is also configured with a database 265 for storage of a plurality of digital media files. As described in more detail below, one aspect of the invention provides a database structure for storing and organizing a vast number of digital media files, for improved communication and file coordination between the plurality of media servers 140 and the media source server 120. It will be appreciated that the software components 255-265 may be loaded from a computer-readable medium into the memory 250 using a drive mechanism associated with a computer-readable medium, such as a floppy, tape, CD-ROM drive, or by download, etc.

Although each of the computing devices of FIG. 1 have been described as conventional general purpose computing devices, those of ordinary skill in the art will appreciate that the computing devices may be constructed from a plurality of unconventional electronic devices, such as a server having a plurality of distributed hardware configuration. In addition, the client computer 130 may comprise of a two-way pager, a cellular phone, a personal data assistant ("PDA"), or the like.

Figure 3:
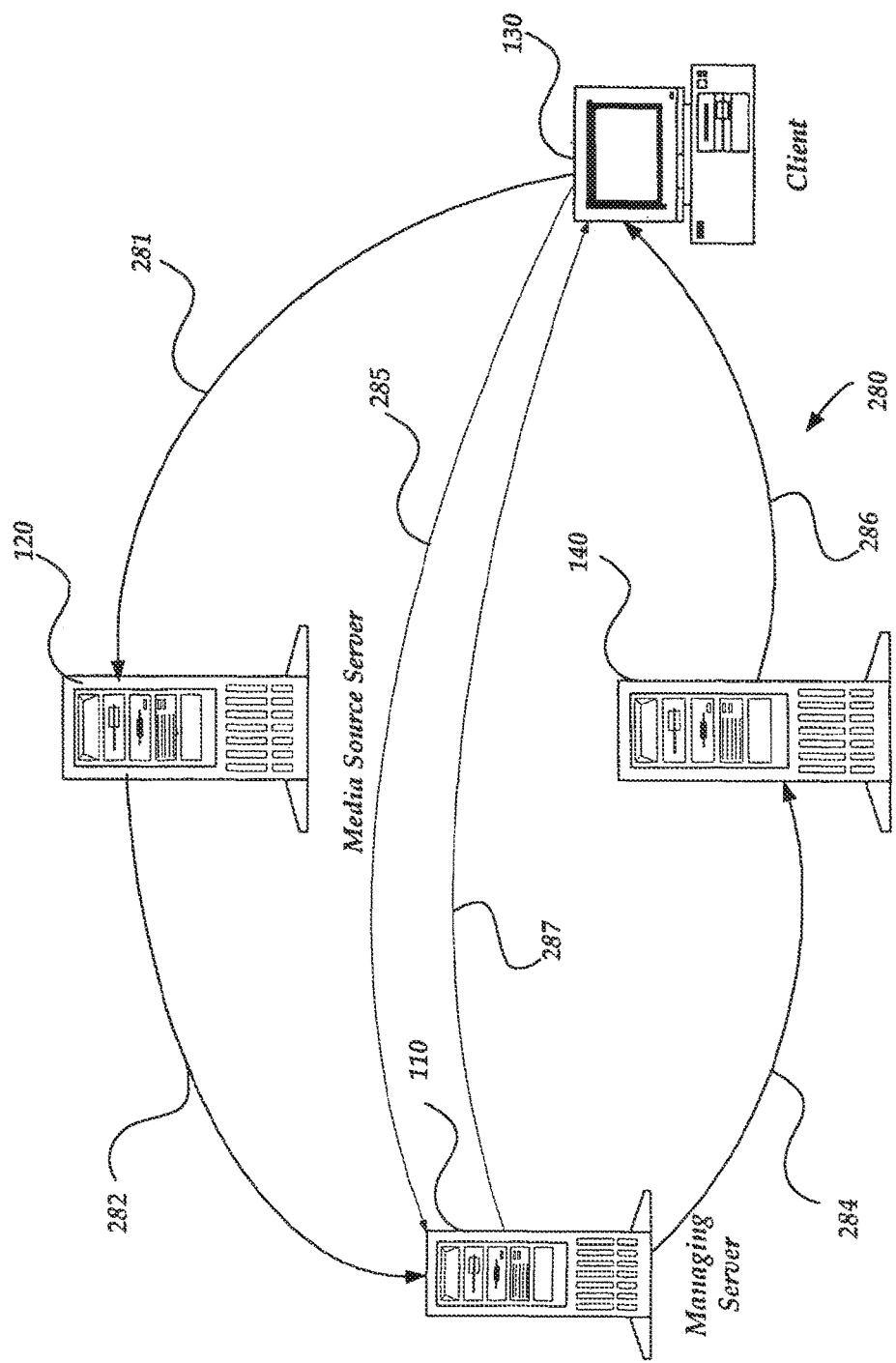
FIG. 3 is a data flow diagram of a computing environment for receiving, storing and distributing digital media.

Referring now to FIG. 3, a general description of the operation of the present invention will be described. In one illustrative example of the present invention, the media source server 120 may be associated with a business entity such as a publisher or content provider offering hypertext documents and media files to users of the client computers 130. The media source server 120 may be configured in one computing device or a plurality of networked computing devices to display hypertext documents having links to media files.

The media servers 140 may be associated with a media service provider such as Akamai or StorageNetworks™. Each media server 140 may be configured to provide a multimedia service such as media storage, streaming, syndication, or the like. As described below, the managing server 110 may be constructed of one or more computing devices, and may be associated with any independent business entity or any business entity described above.

In one aspect of the present invention, an upload process is provided for allowing a user to deliver a media file to the managing server 110 for storage. With respect to yet another aspect of the present invention, a distribution process is provided for allowing users of a client computer 130 to receive and view a multimedia file via a centralized server. Detailed descriptions of the upload and distribution processes are provided below.

The data flow diagram of FIG. 3 generally describes the data transactions between each computing device 110-140 in one implementation of the present invention. One method of the present invention allows a publisher or content provider to upload and release a media file for public viewing. In the following example, a media file is provided by a publisher utilizing a client computer 130. Although this example involves the use of a client computer 130, any networked computing device can be used by the publisher to execute the upload process.

The data flow process starts at data path 285 where the content provider uploads a media file from the media source server 120 to the managing server 110. Once the media file is received by the managing server 110, the managing server stores the media file in its database and associates a plurality of database attributes to the media. As described below, with respect to FIGS. 9A-9C one aspect of the present invention involves a media database architecture to efficiently organize and store the received media files.

Once the media file is stored, the managing server 110 generates a dataset that indicates the location of the stored media file. In accordance to different embodiments, the dataset may be in the form of a URL or any text message that indicates a directory, computer network address, or database ID that describes the location of the media file. As indicated by data path 287, the dataset is transmitted from the managing server 110 to the client computer 130. Once the dataset is received by the client computer 130, the user of the client computer may then readily use the dataset to construct a Web site that links to the uploaded media file.

Referring again to the data flow diagram of FIG. 3, a general description of the distribution process is described. In the following example, a user of the client computer 130 requests for the viewing of a desired media file by selecting a hypertext link that may be displayed on a Web page provided by the media source server 120. The user's request to receive the desired media file may utilize the dataset that is generated in the above-described upload process, where the dataset is imbedded in a selected hypertext link of the Web page provided by the media source server 120.

The user's request originates from the client computer 130 and may be transmitted to the managing server 110 by data path 285, or the user's request may be transmitted to the managing server 110 via the media source server 120 thereby utilizing data paths 281 and 282. Once the managing server 110 receives the user's request, the managing server 110 processes the user's request by using the dataset to determine the proper location of the requested media file. Once the media file is located, the managing server 110 transmits a metadata file to the client computer 130 that allows the client computer to display the requested media file. In one embodiment, the metadata file may be in the form of an ASX data file. As known to one of ordinary skill in the art, a received ASX file allows any client computer to display a media file by the use of a media player application.

Figure 4:
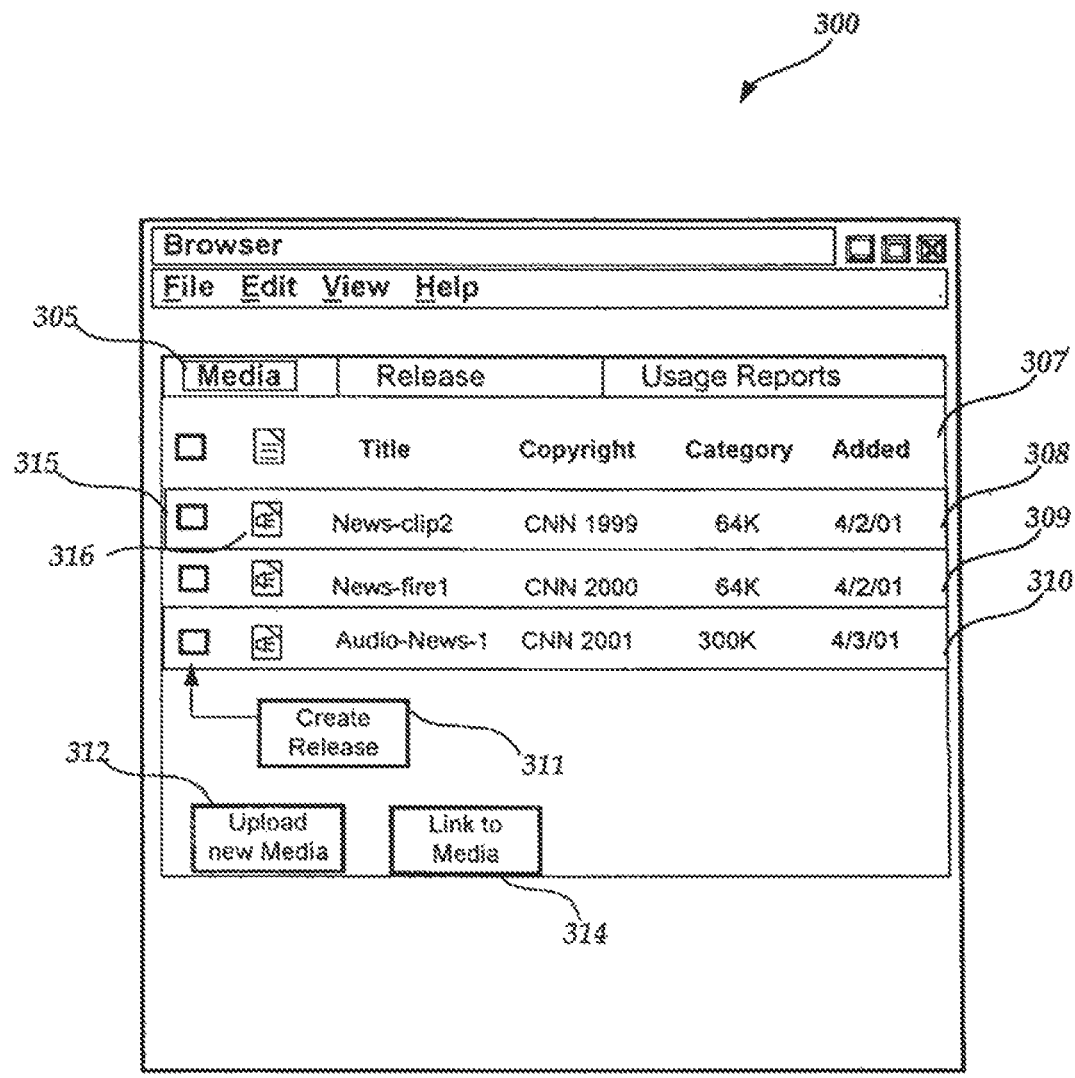
FIG. 4 is an illustrative example of a graphical user interface for viewing media stored in the system of the present invention.

Referring now to FIG. 4, aspects of an illustrative example of a user interface utilized to facilitate an upload process will be described. The screen illustration of FIG. 4 is one example of a media Web page 300 that is configured to display media information to a user such as a publisher or media content provider. As illustrated in FIG. 4, the media Web page 300 displays three entries 308-310 where each entry represents a Media received by the managing server 110. Also shown in FIG. 4, the media Web page 300 is configured to provide general information regarding the Media received by the managing server 110.

According to one aspect of the present invention, the term "Media" can be defined as any source material in a video or audio format that communicates a particular input source, such as specific footage of a video or audio clip. In this definition of Media, one Media may be associated with a plurality of media files having the same video or audio footage; however, each media file may be configured to display the related Media at a different bit-rate or different data format.

As shown in FIG. 4, the media Web page 300 displays media information 307 such as the copyright, category and time stamp data for each Media. The media Web page 300 is also configured to display a navigation menu 305 for illustrating the type of information displayed on the media Web page 300. In addition, the media Web page 300 is configured to display an icon 316 for identifying the managing server 110. The selection checkboxes 315 of the media Web page 300 allow the user to select one of the media entries 308-310 to apply one of the function buttons 311-314. As described below, the function buttons 311-344 allow a user to upload new Media, link a new Media, or create a new Release of a Media.

The media Web page 300 is configured with a feature for uploading new Media to the managing server 110. To start the upload process, the user actuates the "upload new Media" button 312. In response to the user actuation of the "upload new Media" button 312, the computing device displays a Windows® navigation menu that allows the user to browse through a menu displaying the files stored on the device's local hard drive. From the Windows® navigation menu, the user selects one of the local files to upload to the managing server 110. The selected files are then transferred from the client computer 130 to the managing server 110 by a file transfer communication link. As described below with reference to FIGS. 9A-9C, each new media file having a unique input source ("Footage") is stored as an independent Media database entity, and each Media database entity is independently described on the media link page 300.

In an alternative embodiment, the managing server 110 is configured to receive a link to a media file stored on a remote network computer. In this embodiment, instead of providing an actual file for storage on the managing server 110, the user provides a text link, such as a URL, and media information data to the managing server 110. To link a particular media to the managing server 110, a user actuates the "link to media" button 314. In response to a user actuation of the "link to media" button 314, the managing server 110 generates a media link window that prompts the user to enter specific Media information.

Figure 5:
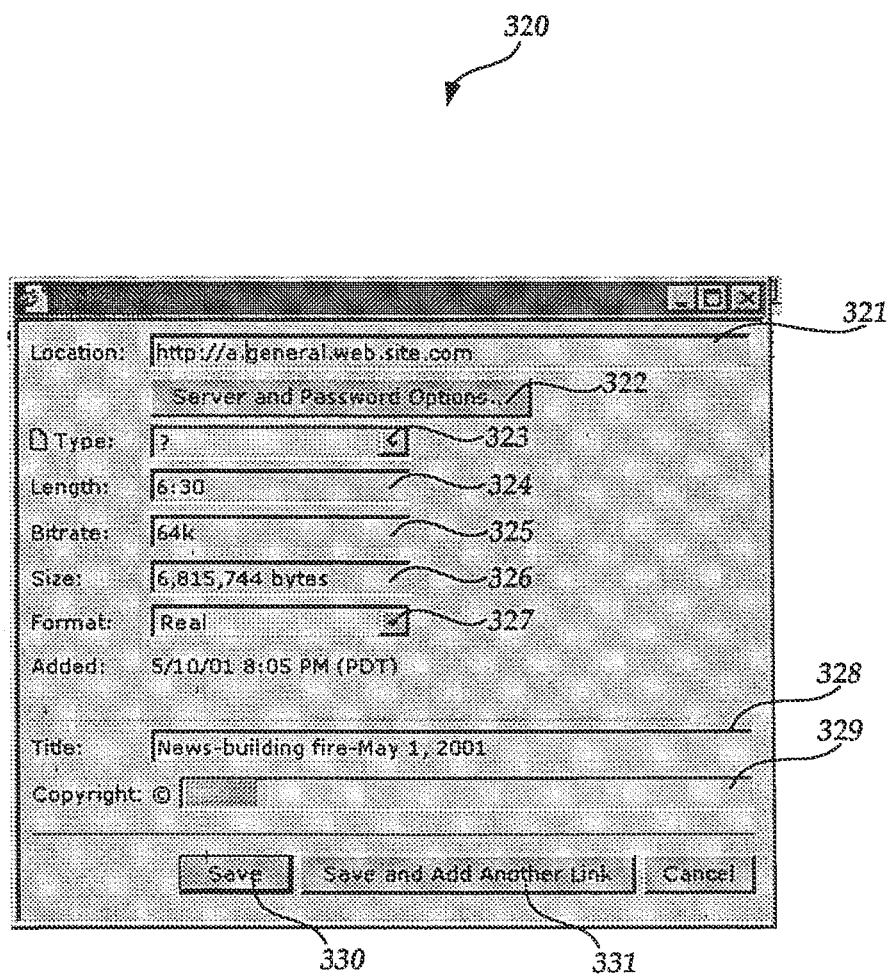
FIG. 5 is an illustrative example of a graphical user interface configured for communicating delivery parameters of media files.

Referring now to FIG. 5, a representative screen shot of a media link window 320 is shown and described. As shown in the screen shot of FIG. 5, the media link window 320 is configured to prompt the user to provide an address 321 indicating the location of the new media file. The media link window 320 is also configured to receive user login and password information. This configuration accommodates situations where the user wishes to link a media file stored on a secure Web server. Also shown by data fields 323-327, the media link window 320 prompts the user to enter specific information describing the media file, such as the file type, length, bit-rate, size, format, title, and copyright information. The media link window 320 is also configured with a plurality of buttons 330 and 331 to allow the user to communicate the media file information to the managing server 110.

Figure 6A:
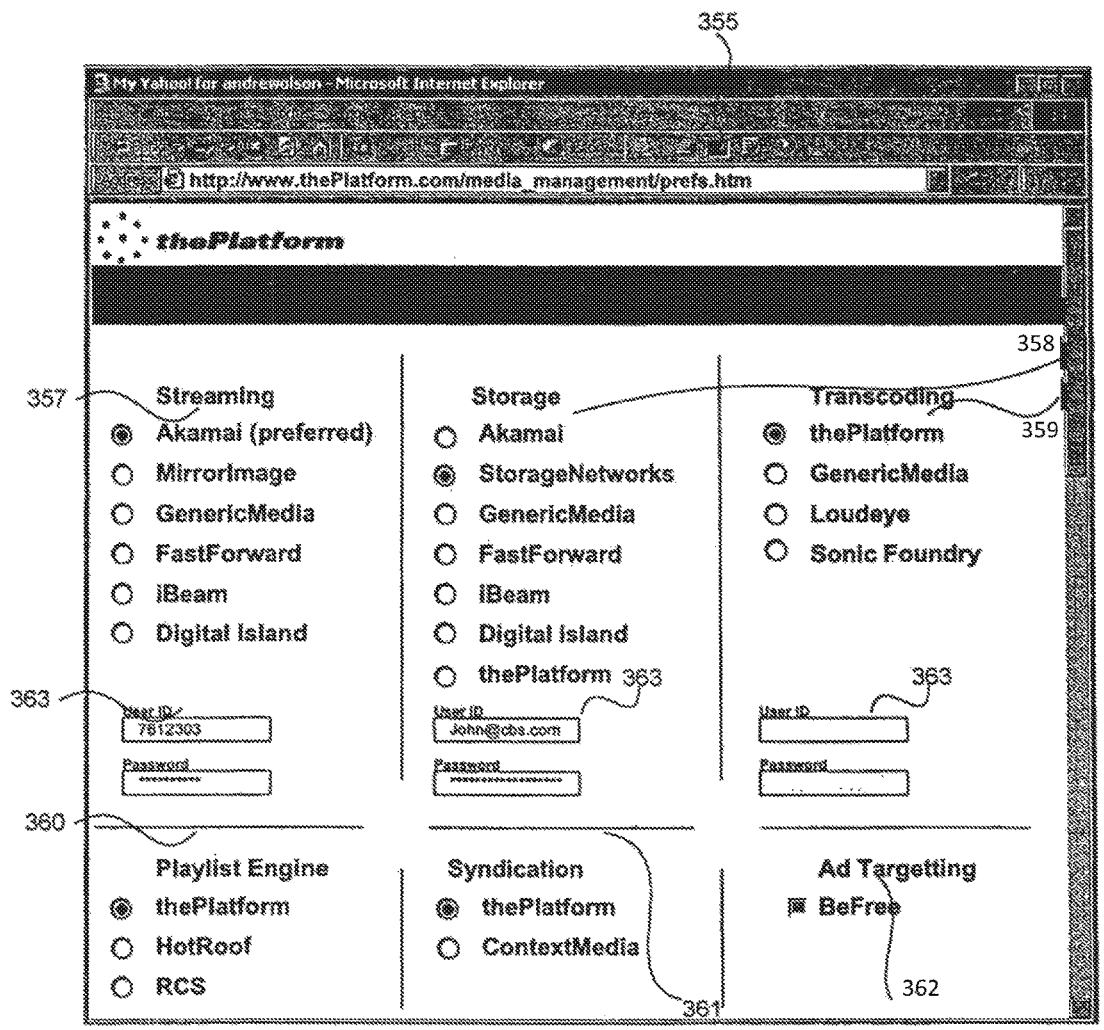
FIGS. 6A, 6B and 6C are illustrative examples of graphical user interfaces configured for receiving service provider settings from a user.

Once the managing server 110 has created at least one Media, the managing server 110 then allows the user to communicate a plurality of service provider settings to the managing server 110. Generally described, the service provider settings allow a user to assign a set of default service providers for the media services of the user's uploaded Media. Referring now to FIG. 6A, a representative screen shot of a service provider configuration Web page 355 is shown and described. As shown, the service provider configuration Web page 355 is configured to display a number of service providers. The service provider configuration Web page 355 is also configured to allow the user to select a set of service providers for the respective media services that may apply to the user's Media. In this example, the user has assigned Akamai™ as the default service provider for the streaming services 357, StorageNetworks™ as the default service provider for the offsite storage services 358, and the Platform™ as the default service provider for the transcoding 359, playlist 360 and syndication 361 services. Additional service providers may be listed on the Web page 355 for other media services such as the ad targeting service 362 shown in FIG. 6A. The service provider, configuration Web page 355 is also configured with a plurality of user I.D. and password fields 363 for receiving security information that allows the managing server 110 to access the selected media service systems.

Once the managing server 110 has created at least one Media and received the service provider settings, the server then allows the user to create a "Release" of the Media. According to the present invention, the term "Release" can be defined as a separate database entity that is related to the Media database entity, where the Release database entity stores specific delivery setting information for the related Media. In addition, the Release database entity relates a specific media file to the Media database entity. As will be described below with reference to FIGS. 9A-10, the database structure having Media and Release database entities allows a user, such as a content provider, to publish a Web page that allows viewers to receive one Media at different bit-rates or file formats while allowing the content provider to control and manage each media file through one interface.

In the creation of a Release database entity, the user provides a delivery setting, e.g., a bit-rate and a file format for the selected Media. For example, if a user wishes to create a Release of the first Media 308 of FIG. 4, the user would select the Media by selecting the checkbox 315 and actuating the "create Release" button 311. The server then prompts the user to enter the delivery settings for new media Release. In one embodiment, the server may prompt the user to enter the delivery settings by the use of a graphical user interface such as the release settings Web page 355' shown in FIG. 6B. As shown, the release settings Web page 355' is configured to receive specific delivery settings for the Release such as the desired bit-rate and file format. The release settings Web page 355' may be configured to receive the delivery settings by the use of a pull-down menu 366. As shown in this illustrative example, a user has set the delivery settings of a new Release to a streaming Windows Media format at 64 Kbits/sec. Once the Release is created, as described in more detail below with reference to FIG. 10, the server locates or generates a derivative media file having the user provided delivery settings. In addition, the server associates the derivative media file with the related Release and Media database entities.

The process of creating a Release database entity may also involve receiving individual service provider settings for each Release database entity. This embodiment allows the user to override the default service provider settings established for all Media, and assign different service provider settings for each Release. For example, a first Release of one Media may be configured to have the streaming service provided by Akamai™, while a second Release of the same Media may be configured to have the streaming service provided by iBeam™. To implement this embodiment, the managing server 110 may be configured to produce a Web page that allows the user to select a set of service providers. In one embodiment, the service provider configuration Web page 355 of FIG. 6A may be displayed to allow the user to select the individual service provider settings for each Release. Alternative embodiments of a service provider configuration interface may include other Web page configurations, such as the release settings Web page 355' as shown in FIG. 6B.

Figure 6B:
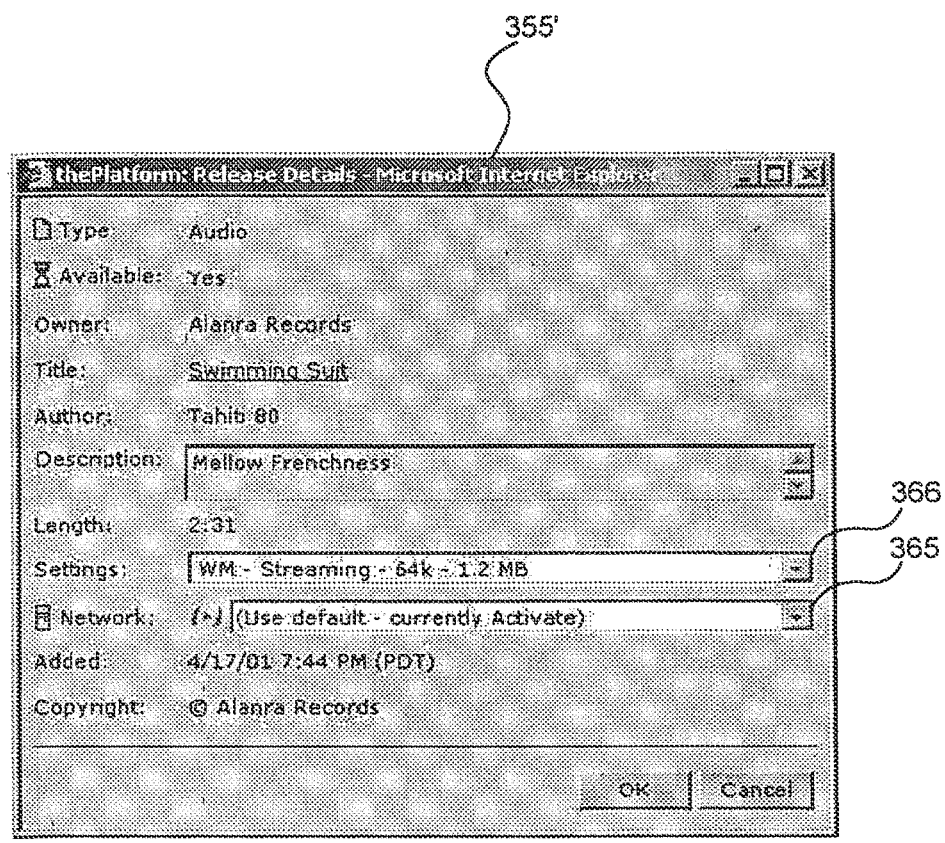

As shown in FIG. 6B, the release settings Web page 355' allows the user to select a service provider for an individual Release. In this embodiment, the service provider setting may be received from the user by the use of a pull-down menu 365 in the Web page. In the illustrative example shown in FIG. 6B, the user has selected a service provider setting that assigns Activate™ as the network service provider to stream the Media file associated with the Release. In another embodiment, the release settings Web page 355' may also be recalled by the user at any time to modify the delivery or service provider settings for any Release database entity stored on the managing server 110.

Figure 6C:
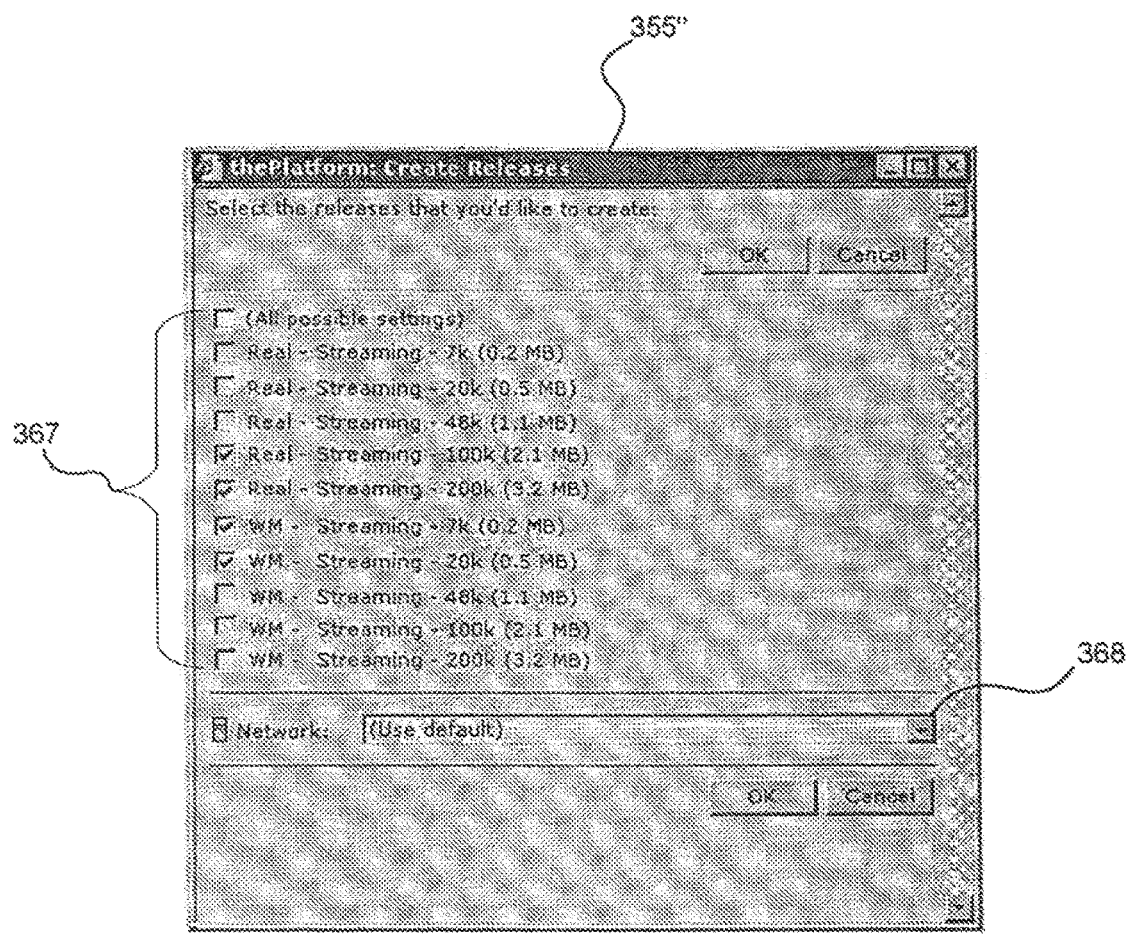

In yet another embodiment of the release settings Web page, the managing server 110 may generate a release settings Web page 355" to allow a user to create or edit a plurality of Release database entities by the use of a single graphical user interface. Referring now to FIG. 6C, the release settings Web page 355" may display a plurality of Release database entities 367. In addition, the release settings Web page 355" may include a pull-down menu 368 that allows a user to select a service provider setting for all of the selected releases created or modified by the use of the Web page 355". As shown in this illustrative example, the user has selected four delivery setting options for the creation of four separate releases. As shown, the selected options in this illustrative example will prompt the managing server 110 to create two Release database entities having Real streaming files at the bit-rates of 100K and 200K, and two Release database entities having Windows Media streaming files at 7K and 20K. The pull-down menu 368 allows a user to apply one global service provider setting for all of the selected Release database entities.

Figure 7:
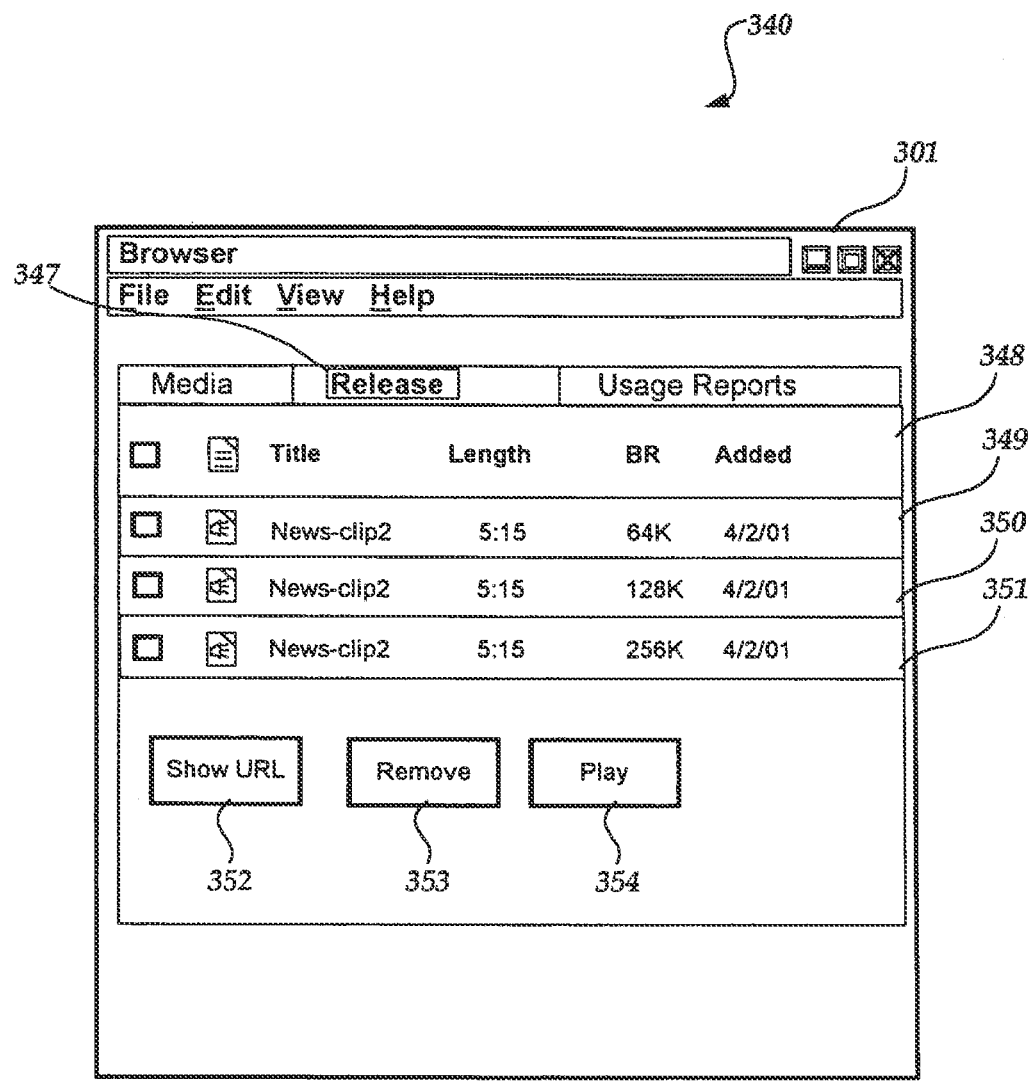
FIG. 7 is an illustrative example of a graphical user interface configured for receiving Release information of a media file from a user.

Referring now to FIG. 7, a release Web page 340 illustrates an example where a user has created three Releases of the first Media 308 shown in FIG. 4. In this example, the user has created three Releases 349-351, which are respectively configured to transmit at bit-rates ("BR") of 64K, 128K and 256K. As illustrated in the release Web page 340, each Release associated with the first media 308 is displayed such that each Release contains the same title. The release Web page 340 is also configured to display a navigation menu 347 for identifying the release Web page 340.

The release Web page 340 is also configured to display two control buttons 353-354 for removing or viewing any one of the video or audio Releases. In addition, the release Web page 340 is configured with a "show URL" button 352, which allows the user to view the location information of the media file associated with the Release. When the user actuates the "show URL" button 352, the managing server 110 generates a separate Web page communicating the location information for the associated media file. In one embodiment, the location information may be in the form of a uniform resource locator (URL) that is communicated by a Web page. In other embodiments, the URL associated with each Release is communicated to the user by the use of other electronic means. For example, the URL may be communicated to the user by an e-mail message, file transfer, or any other like means of communication.

As described above, the graphical user interfaces used in FIGS. 4-7 allow a user to upload a media file to the managing server 110 from any remote computing device such as the media source server 120 or client computer 130. Once the server receives a new media file and the related Release information, the server stores the media file in the appropriate database entities and then generates the location information for the received media file.

Figure 8:
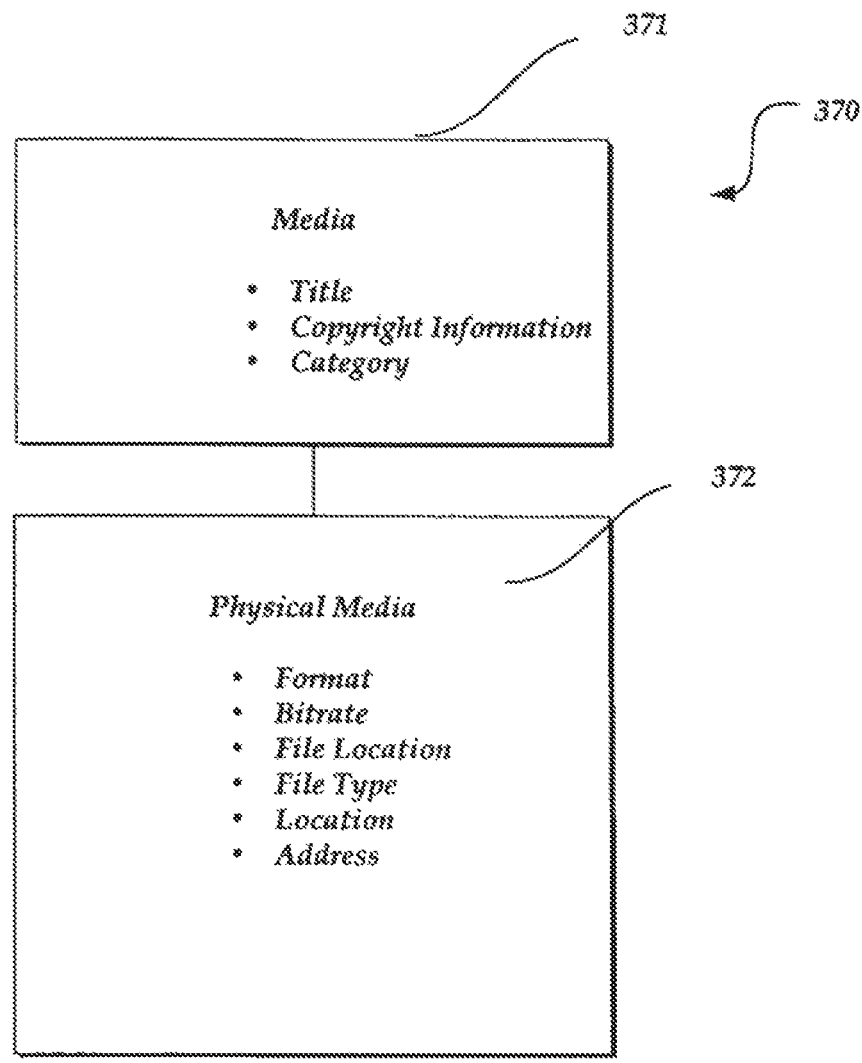
FIG. 8 is an illustrative example of a data structure utilized to store media files in accordance with one aspect of the present invention.

FIG. 8 illustrates a generalized database structure 370 utilized by one actual embodiment of the present invention. The data structure illustrated in this example includes a database structure for storing Media database entities 371 and physical media database entities 372. As described above, each Media received by the managing server 110 represents a specific input source or, a unique audio or video footage. Each Media database entity 371 stores data attributes such as the Media's title, copyright information and category information. Although these specific data attributes are used in this illustrative example, each Media database entity 371 may use any other type of information that identifies the Media as a unique input source.

As shown in FIG. 8, the Media database entities have a corresponding physical media database entity. In a typical implementation of the present invention, there may be a plurality of physical media database entities for each media database entity. The physical media database entity 372 stores specific information for every physical file that is associated with each Media. More specifically, the physical media database entity 372 is configured to store a file format, bit-rate, file location, file tape, location, and file address. Although the representative example of FIG. 8 shows two generations of a parent/child data structure, additional database entities can be utilized with this database structure. For example, another database entity may be created to monitor and track each Release associated with the Media and physical media objects.

Figure 9A:
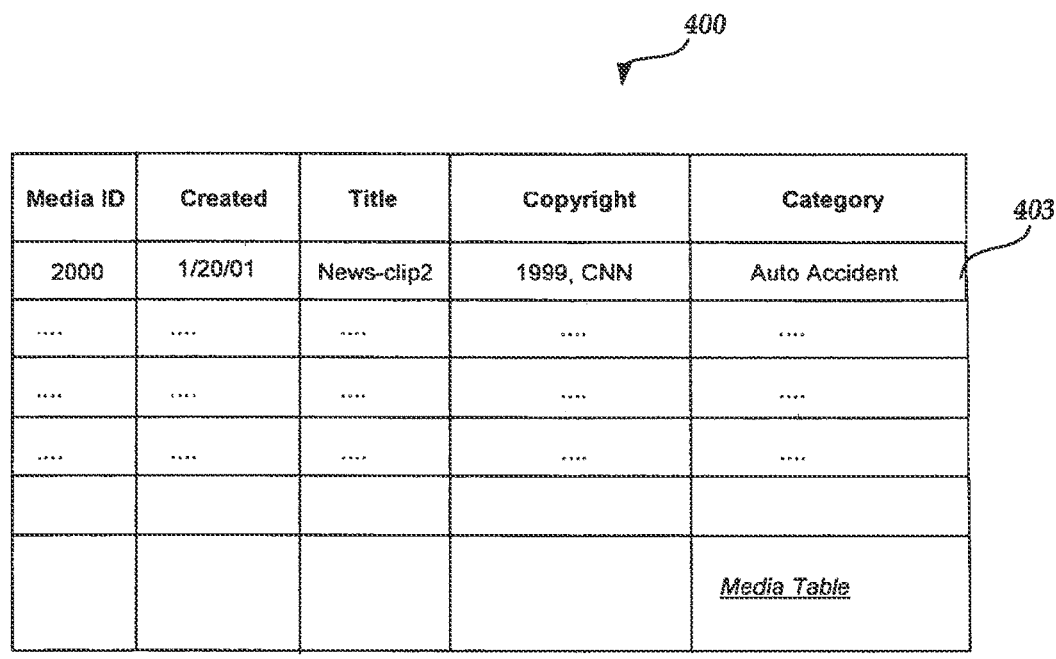
FIG. 9A is an illustrative example of a Media Table in accordance with one aspect of the present invention.

Referring now to FIGS. 9A-9C, a more detailed description of a database structure in accordance with the present invention is shown and described below. The database structure of FIGS. 9A-9C enables the managing, server 110 to efficiently receive, organize, and monitor the voluminous quantity of sizable multimedia files that are transferred between the computing devices of the content providers and service providers. The database structure of this embodiment also allows a user of a client computer 130 to readily access a media file by the use a simplified file request.

Generally described, the example database structures of FIGS. 9A-9C are based on the database structure 370 illustrated in FIG. 8. The representative-database section shown in FIGS. 9A-9C includes three types of tables: FIG. 9A represents a Media Table, FIG. 9B represents a Release Table, and FIG. 9C represents a physical Media Table. As described below, each database table is configured to associate the received physical media files related to a Media and Release database entity created by a user.

Referring now to FIG. 9A, the details of one illustrative example of a Media Table 400 are shown and described. The illustrative example shown in FIG. 9A represents a Media Table 400 having a first media database entity 403. Generally described, a media database entity 403 is generated when a user creates a new Media on the managing server 110. As applied to the example of FIGS. 4-7, the first media database entity 403 is an example database entity that represents the first Media 308 created in the upload process described above with reference to FIG. 4. As shown in FIG. 9A, this embodiment includes the storage of five types of data attributes for each Media received by the managing server 110. More specifically, the Media table 400 stores a title, media ID, creation date, copyright and category information for each Media.

In addition to storing the data attributes, the managing server 110 generates a unique database identifier, referred to as a Media ID, for each new Media created on the managing server 110. In one embodiment, the managing server 110 also retrieves a computer timestamp that indicates a time at which the new Media is created. After all data attributes are generated or retrieved, the managing server 110 then stores the data attributes and the Media ID in a new entry of the Media Table 400. As described above, the managing server 110 creates a new entry in the Media Table 400 each time the managing server 110 receives a physical media file that represents a new input source.

Referring now to FIG. 9B, details of one illustrative example of a Release table 401 are shown and described. The illustrative example shown in FIG. 93 represents a Release table 401 having a plurality of Release database entities 407-409. Generally described, a Release database entity is generated when a user creates a new Release on the managing server 110. As applied to the illustrative example of FIGS. 4-7, the Release database entities 407-409 represent three new Releases of the corresponding Media database entity 403 shown in FIG. 9A. For instance, the first Release database entity 407 represents a first Release of the corresponding Media 403 having a delivery setting of 64K. As described above, the transfer settings are received from a user via a graphical user interface and stored in the Release Table.

The Release Table 401 is configured to store a plurality of data attributes that relate the Media database entity to a physical media file and identify the delivery settings for the Release. In one embodiment, the data attributes of the Release Table 401 comprise several data fields such as a File ID, Release ID, Media ID, and a transfer setting. As shown in FIG. 9B, the attributes of the Release Table 401 may also store data that describes the "File Type" or format of the associated media file, e.g., "WM" for Windows Media Player® format.

In one embodiment of a Release Table, the File ID is dynamically generated and stored in the Release Table when the managing server 110 receives a physical media file associated with the Release. Similarly, the managing server 110 also generates a unique Release ID for each newly created Release. Once the managing server 110 receives the user-specified delivery settings and generates each ID, the data is stored in a new Release database entity as shown in FIG. 9B. In the example of FIG. 9B, a Release ID of 123549 and a File ID of 2343 are generated to represent an illustrative example of a Release of the Media (403 of FIG. 9A) having the Media ID of 2000. The user-specified setting of 64K is also stored in the first Release database entity 407.

Referring now to FIG. 9C, details of one illustrative example of a Physical Media Table 402 are shown and described. Generally described, the Physical Media Table 402 stores the location information of each media file received by the server. In addition, the Physical Media Table 402 relates each media file to the corresponding Media and Release database entities. The illustrative example shown in FIG. 9C represents a Physical Media Table 402 having a plurality of file database entities 411-413. In this example, each file database entity stores the Media ID, File ID and File Location information for one Media file.

As applied to the example of FIG. 9B, the first file database entity 411 stores a File ID of 2343, Media ID of 2000 and a file location address of http://serviceprovider-.com/32489747?3455 related to the media file related to the first Release database entity 407 of FIG. 9B. In addition, the first file database entity 411 stores an attribute, labeled as CDN, that allows the server to readily determine if the media, file is located at a remote storage location. In one illustrative example, if the physical media file is stored on the managing server 110, the CDN value is "no." Accordingly, if the physical media file is stored on a remote computer, the CDN value is "yes."

As known to one of ordinary skill in the art, the implementation of the above-described database tables can be based on a Structured Query Language (SQL) database engine, such as those provided by Microsoft Corporation.

Alternatively, the above-described table structures, algorithms, and methods can be implemented in a client-server computing environment using database programs provided by ORACLE or other like database applications.

Figure 10:
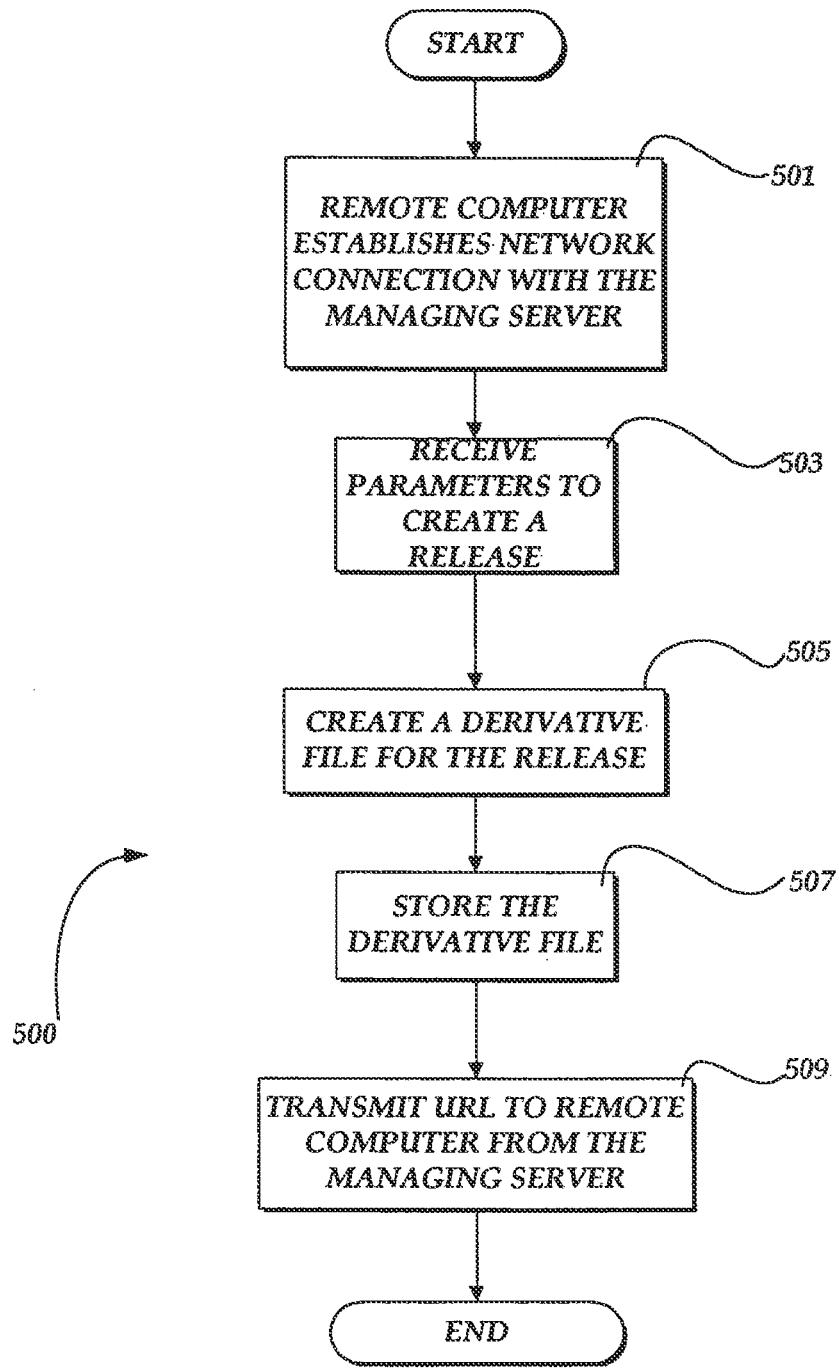
FIG. 10 is a flow diagram illustrating a method for receiving and storing digital media files from a remote computing device.

Referring now to FIG. 10, a flow diagram describing one implementation of the media upload routine 500 formed in accordance with the present invention will be described. The upload routine 500 illustrated in FIG. 10 and described below provides efficient data transfer between a client and server computer by allowing a user to upload a media file to one computing device while having the capability of utilizing a number of computing devices associated with different service providers. Although the following illustrates an example of a user uploading a media file from a client computer 130, it can be appreciated that the following an upload in accordance with this method can originate from any networked computing device.

The upload routine 500 begins at block 501 where the client computer 130 establishes a network connection with the managing server 110. The network connection in the process of block 501 is in the form of any network protocol sufficient for transferring a data file between computing devices, such as a FTP connection. The network connection may be invoked by a user action from the client computer 130 viewing a Web page served from the managing server 110. One example of a user action includes the actuation of the "upload new Media" button 312 as shown in the example of FIG. 4. Also described above, the actuation of the "upload new Media" button 312 indicates that the user desires to create a new Media database entity on the managing server 110.

In the process of creating a new Media database entity, the managing server 110 first receives the new media file from the client computer 130 via the network connection. As described above, the managing server 110 then generates a Media ID and retrieves data attributes for storage in the new Media database entity. In one embodiment, the data attributes of the media file are retrieved from information embedded in the received media file. For instance, when the managing server 110 receives a new media file, the system extracts the copyright, category and title information from the media file. As known to one of ordinary skill in the art, generally known media software libraries can be used to configure a software application to extract various data attributes from various formats of digital media files.

In another embodiment, the managing server 110 receives the data attributes of the Media from a user. This embodiment is preferably utilized in a situation where a user links a media file to the managing server 110. As described above, a physical media file may be linked to the managing server 110 when a user creates a new media database entity. In this embodiment, a graphical user interface (FIG. 5) is provided to allow the user to enter and transmit data attributes of a media file to the managing server 110.

Once the media data attributes are received by the managing server 110, or retrieved from a media file, the data is stored in the new Media database entity. In addition, the managing server 110 creates a file database entity to associate the media file to the Media database entity. Examples of such database entities are shown in the database tables of FIGS. 9A-9C.

Once the managing server 110 receives the media file and creates the Media database entity, the upload routine 500 then continues to block 503, where the managing server 110 receives a set of delivery settings from the user to create a Release. As described above, a "Release" is a database entity associated with a Media database entity and the received media file, wherein the Release database entity stores the delivery setting of the physical media file. The managing server 110 receives the delivery setting from a user of a client computer 130 by the use of a graphical user interface that prompts the user to enter a desired bit-rate for the delivery of the specific media file. One such graphical user interface can be implemented as a pop-up window generated by the managing server 110.

Once the managing server 110 receives the delivery setting from the user, the managing server 110 then creates a Release database entity in the Release Table 401. Examples of several Release database entities 407-409 are shown in FIG. 9B. As described above, in the process of generating a new Release database entity, the managing server 110 generates a unique Release ID for storage with the received delivery setting.

The upload routine 500 then continues to block 505 where the managing server 110 creates a derivative file for the Release. Generally described, the process of block 505 locates or generates a media file having the input source (footage) as the related Media and also configured to the delivery setting of the Release. In one embodiment, the managing server 110 applies an automated transcoding routine to the media file of the related Media database entity, also referred to as the master file, to generate a derivative media file for the Release. For instance, if the media file of the related Media database entity is in the format of an AVI file having a bit-rate of 256K and the delivery setting of the Release is 64K in a WMA format, the managing server 110 automatically generates a 64K WMA file (derivative file) from the 256K AVI file.

In the execution of the transcoding routine, the managing server 110, utilizes various graphical software applications to examine the master file to determine the types of files that can be generated from the master file. The managing server 110 then utilizes other media applications such as Media Cleaner 5 produced by Terran-Interactive® to generate the derivative file for the Release.

Once the derivative file is generated, the upload routine 500 then continues to block 507 where the managing server 110 then stores the derivative file in its memory or at a computing device associated with a service provider. As described above with reference to FIGS. 6A-6B, any one of the media files may be stored in a remote computing device depending on the media service setting associated with the Media. For instance, if the user has selected StorageNetworks™ as the service provider for the storage services, the process of block 507 would also include communicating the derivative file to the computing device associated with StorageNetworks™. As known to one of ordinary skill in the art, the communication of the derivative file may be carried out by the use of any file transfer protocol or the like. In the process of block 507, the managing server 110 also generates a File ID for the derivative file and stores the storage location information and File ID in the Physical Media Table 402. As described above, the File ID is also stored in the related Release database entity of the Release Table 401.

One example of the process of block 507 is shown in the first entity of the Physical Media Table 402. When the derivative file is stored, the storage location information and the File ID of 2343 is stored in the first record 411 of the Physical Media Table 402. The generated File ID is then stored in the corresponding entity 407 of the Release Table 401.

In a preferred embodiment of the present invention, the File ID stored in the Release Table 401 and the Physical Media Table 402 is a cached identification number that can be modified if the physical media file associated with a Release is deleted or moved. For example, the File ID of the first record 407 of FIG. 8B is assigned a value of 2343, which relates to the File ID of the first record 411 of the Physical Media Table 402. If the user deletes the physical media file of record 411, the File ID of 2343 is deleted from the Physical Media Table 402 and the Release Table 401. When the server receives a new physical media file related to the first Release 407, a new File ID is generated for the first record 407 of the Release Table 401. In addition, a new database entry will be generated in the Physical Media Table 402 for storing the file location information and the new File ID.

Returning again to FIG. 10, the upload routine 500 then continues to block 509 where the managing server 110 transmits the storage location information of the derivative media file to the user of the client computer 130. As described above, the location information of the derivative media file may be in the form of a URL or other like network address. In one preferred embodiment, the location information is in the form of a URL having the Release ID related to the Media. As described in more detail below with reference to FIG. 11, the use of the Release ID in the file location information provides an efficient method for the system to determine the location of the media file.

In one embodiment, the location information may be transferred to the user via a Web page that is generated when the user actuates the "Show URL" button 352 shown in the Release Web page 340 of FIG. 7. In other embodiments, the managing server 110 is configured to communicate the location information to the user by an email message, instant message, or any other like methods of communication. Once the user receives the location information, the location information can be readily inserted into the code of a Web page constructed for publishing the Media.

Figure 11:
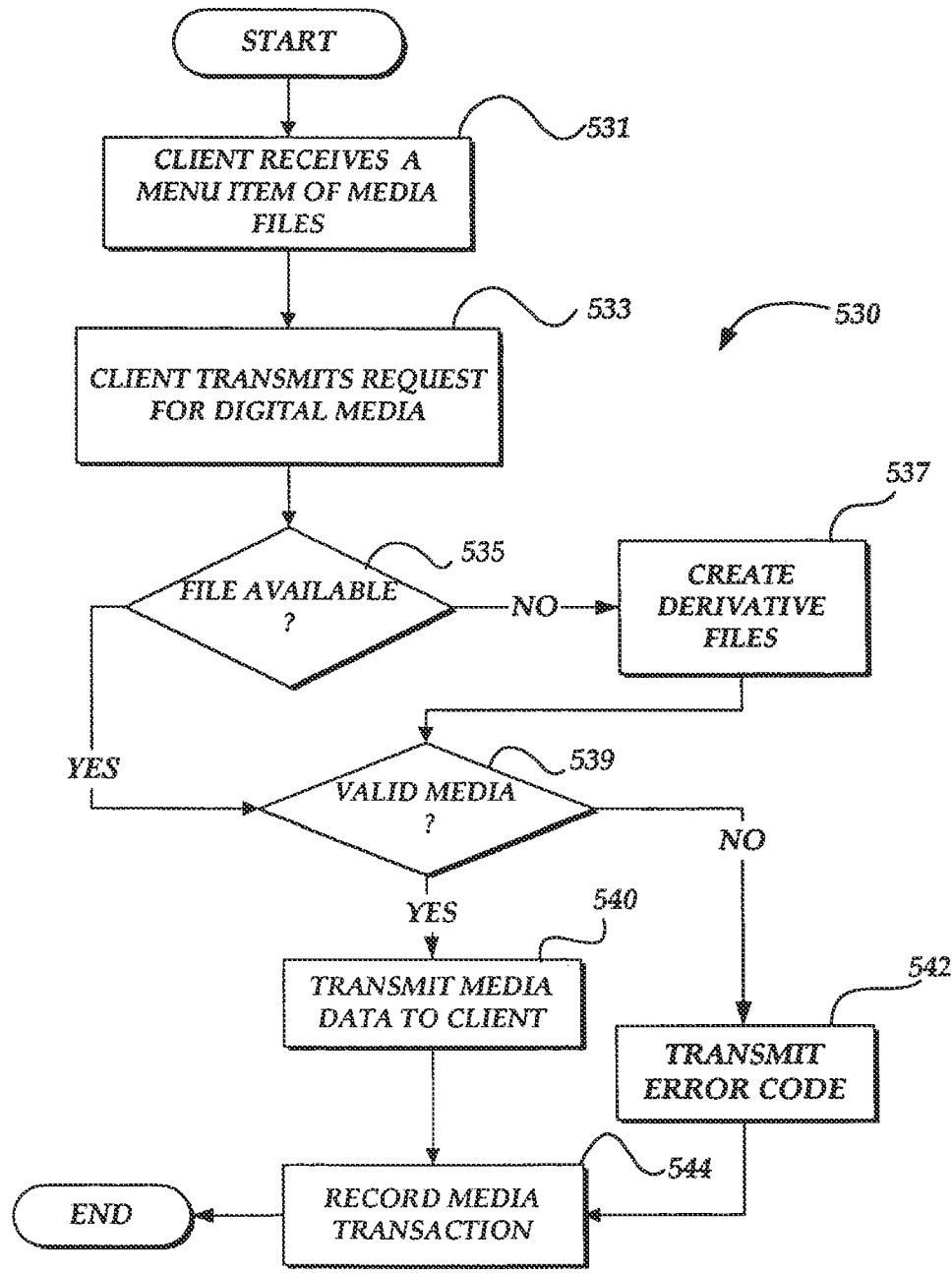
FIG. 11 is a flow diagram illustrating a method for distributing digital media to a plurality of computing devices.

Now referring to FIG. 11, distribution routine 530 formed in accordance with the present invention will now be described. The distribution routine 530 illustrated in FIG. 11 provides a method for distributing digital media files from the managing server 110 and/or a media server 140 to one or more client computers 130. Generally described, when a user of a client computer 130 views a Web page by a media source server 120 offering the publication of a Media, the client computer 130 transmits a request to view the Media to the managing server 110. In turn, the managing server 110 locates the media file associated with the Media and transmits a signal back to the client computer 130, which allows the user to readily view the Media.

The distribution routine 530 begins after the client computer 130 establishes a-network connection with a Web server of a content provider, such as the media source server 120 to receive a Web page having a menu of media items. A media source server 120 may be any Web server that offers a digital media file in the form of a download or a streaming data signal. Examples of some media source servers 120 involve Internet portals, news Web servers, and/or any other like Web page offering video or audio files. In the typical Web page, the user of the client computer 130 will receive a menu item of media files, wherein the menu item will also allow the user to select one or more bit-rates for the desired media file. As known to one of ordinary skill in the art, such a Web page may also offer a media file in different formats to accommodate different media players.

In this illustrative example, it is preferred that the Web page publishing the Media utilize the location information generated in the above-described upload routine 500. Accordingly, the Web page publishing the Media may be configured with a URL having a Release ID related to the media file having the bit-rate and format desired by the viewer.

Once the user of the client computer 130 selects the Media hypertext link associated with the desired format and bit-rate, the distribution routine 530 continues at block 533 where the client computer 130 transmits the location information, e.g. the URL having a Release ID, to the managing server 110. In this part of the process, the location information may be sent from the client computer 130 or the media source server 120 offering the publishing Web page.

Responsive to receiving the location information, the distribution routine 530 continues at decision block 535 where the managing server 110 determines if the media file related to the requested Release is available. The process of block 530 involves a database query utilizing the received Release ID. In one embodiment, the managing server 110 utilizes the received Release ID in a query to the database tables of FIGS. 9A-9C to determine if a File ID exists in the Release database entity. As described above, the File ID is dynamically assigned to a Release database entity when a media file is stored on the server. Accordingly, when the media file is removed from the server, the File ID is also removed from the related Release database entity.

At decision block 535, if the managing server 110 determines that there is no media file associated with the requested Release, the process continues block 537 where the managing server 110 creates a derivative media file that is configured to the delivery settings of the Release. The process of block 537 is carried out in the same manner as the process of block 505 of FIG. 10.

Once the derivative file is generated, the managing server then store the derivative file in its memory or at a computing device associated with a server's provider. As described above in the process block 507, the managing server 110 also generates a File ID for the derivative file and stores the storage location information and File ID in the Physical Media Table 402. As described above, the File ID is also stored in the related Release database entity of the Release Table 401.

Alternatively, at decision block 535, if the managing server 110 determines that there is a media file associated with the requested Release, the distribution routine 530 continues at decision block 539 where the managing server 110 determines if the associated media file is valid. In this part of the process, the managing server 110 utilizes the Release ID and File ID to determine the network or directory address of the media file. For example, as described above with reference FIGS. 9A-9C, the managing server 110 may retrieve a file location network address of "http://serviceprovided.com/3248974?3455." by the use of database query having the Release ID of 123549. The managing server 110 then utilizes the network or directory address to verify if the media file is stored in the correct network or directory location. In one embodiment, if the media file is not located in the correct network or directory location, the managing server 110 determines that the media file is invalid. In another embodiment, the managing server 110 determines that a media file is invalid if the format of the media file is not consistent with the file format stored in the in the Release database entity.

If the media file is found to be invalid, the distribution routine 530 continues at block 542 where the managing server 110 transmits an error code to the client computer 130. In one embodiment, the error code may be in the form of a text message indicating the type of error discovered in the process of block 539. In the process of block 542, the managing server 110 may generate a Web page or instant message window to communicate the error code to the user requesting the Media.

Alternatively; at decision block 539, if the managing server 110 determines that the media file is valid, the distribution routine 530 continues at block 540 where the managing server 110 transmits media data, also referred to as metadata file, that allows the client computer 130 to receive the requested media file. In one preferred embodiment, media data is in the form of an ASX file. As known to one of ordinary skill in the art, an ASX file contains a plurality of data attributes for a media file such as copyright, title, and other like information. In addition, an ASX file communicates the file location address of the requested Media and a delivery method, such as a file download or a data stream.

As applied to the example of FIG. 9A-9C, if the user of the client computer 130 requested the viewing of a media file having a Release ID of 123549, the managing server 110 would generate an ASX file having a delivery method of a streaming video file at 64K in a WMA format. In addition, the ASX file would contain the file location address: "http://serviceprovided.com/3248974?3455." Responsive to receiving the ASX file, the client computer 130 executes a media player application to receive and play the requested media according to the delivery settings embedded in the ASX file.

As shown on block 544, after the managing server 110 transmits an error code at block 542 or transmits the media data to the client computer 130 at block 540, the managing server 110 then records the media file transaction. In the process of block 544, the managing server 110 may generate a database record of all user requests for the Media or Release. The record database may store various information about each transaction. For instance, the record database may indicate a time and date at which each file is requested, a network address of each client computer 130 requesting the Media, a record of the number of times a media file is accessed, or any other like information related to activity of the distribution routine 530.

Thus, by the use of the present invention, a user may efficiently upload and publish a digital media file from a centralized computing device. In addition, users of client computers may readily access the published digital media files by the use of the distribution process described above. As a result of the system and method of the present invention, a computing device can be configured to efficiently manage and track large quantities of sizable media files between multimedia computing systems associated with different service providers. In addition, the system and method of the present invention also provides other novel media services, such as automated file transcoding.

While the preferred embodiment of the invention has been illustrated and described, it will be appreciated that various changes can be made therein without departing from the spirit and scope of the invention.

The invention claimed is:

1. A method comprising:
receiving, by at least one computing device and via a user interface, a user indication of:
first login information associated with a first service provider, and
second login information associated with a second service provider;
causing, based at least in part on the first login information, the first service provider to generate a derivative media file based on a source media file; and
causing, based at least in part on the second login information, the second service provider to send the derivative media file via a network.

2. The method of claim 1, wherein the first service provider comprises a transcoding service provider, and wherein the causing the first service provider to generate the derivative media file comprises causing the transcoding service provider to transcode the source media file into the derivative media file.

3. The method of claim 1, wherein the second service provider comprises a streaming service provider, and wherein the causing the second service provider to send the derivative media file comprises causing the streaming service provider to stream the derivative media file via the network.

4. The method of claim 1, further comprising:
receiving, via the user interface, a user selection of a third service provider; and
causing the third service provider to store the derivative media file that was generated by the first service provider.

5. The method of claim 4, wherein the first service provider comprises a transcoding service provider, the second service provider comprises a streaming service provider, and the third service provider comprises a storage service provider.

6. The method of claim 1, further comprising receiving, via the user interface, a delivery setting, wherein the causing the first service provider to generate the derivative media file comprises causing the first service provider to generate the derivative media file based at least in part on the delivery setting.

7. The method of claim 6, wherein the delivery setting comprises a bit rate setting.

8. The method of claim 6, wherein the delivery setting comprises a media format setting.

9. The method of claim 1, further comprising generating a first database entry comprising information about the source media file, a second database entry comprising a relationship between the source media file and the derivative media file and a format of the derivative media file, and a third database entry comprising a relationship between the second database entry and a storage location of the derivative media file.

10. The method of claim 9, further comprising:
receiving an indication of a particular format; and
after a determination, based at least in part on the second database entry, that the derivative media file does not exist in the particular format, generating a further derivative media file based at least in part on the source media file and the particular format.

11. A method comprising:
generating, by at least one computing device, a plurality of derivative media files based at least in part on a source media file and a plurality of delivery settings; and
generating a database, the database comprising:
a first database entry comprising information about the source media file;
a plurality of second database entries, each comprising a relationship between a different one of the plurality of delivery settings and the first database entry; and
a plurality of third database entries, each comprising a relationship between one of the plurality of second database entries and a location of one of the plurality of derivative media files each derived from the source media file.

12. The method of claim 11, further comprising sending at least one of the derivative media files via a network.

13. The method of claim 12, wherein the sending comprises streaming the at least one of the derivative media files via the network.

14. The method of claim 12, wherein the sending comprises sending the at least one of the derivative media files via the network after a determination, based at least in part on at least one of the plurality of second database entries, that the at least one of the derivative media files is of a particular format.

15. The method of claim 11, wherein the generating the plurality of derivative media files comprises transcoding the source media file.

16. A method comprising:
receiving, by at least one computing device and via a user interface, an indication of:
first login information associated with a transcoding service provider,
second login information associated with a delivery service provider, and
third login information associated with a storage service provider;
causing the transcoding service provider to transcode, using the first login information, a source media file into one or more derivative media files;
causing the storage service provider to store, using the third login information, the one or more derivative media files; and
causing the delivery service provider to send, responsive to the second login information, at least one of the one or more derivative media files via a network.

17. The method of claim 16, wherein the causing the delivery service provider to send the at least one of the one or more derivative media files comprises causing the delivery service provider to stream the at least one of the one or more derivative media files via the network.

18. The method of claim 16, further comprising generating a database comprising:
a first database entry comprising information about the source media file;
one or more second database entries, each comprising a relationship between a different one of the one or more derivative media files and the first database entry; and
one or more third database entries, each comprising a relationship between one of the one or more second database entries and a location of one of the one or more derivative media files.

19. The method of claim 18, further comprising:
responsive to a determination, based at least in part on the one or more second database entries, that none of the one or more derivative media files exists in a particular format, creating a further derivative media file based at least in part on the source media file and the particular format.

20. The method of claim 16, further comprising receiving the first login information, the second login information, and the third login information via the user interface.

21. A method comprising:
generating, by at least one computing device, a plurality of derivative media files based at least in part on a source media file and a plurality of delivery settings; and
storing, in a database, information corresponding to the plurality of derivative media files, wherein the database comprises:
a first database entry comprising information about the source media file;
a plurality of second database entries, each comprising a relationship between one of the plurality of delivery settings and the first database entry; and
a plurality of third database entries, each comprising a relationship between one of the plurality of second database entries and a location of one of the plurality of derivative media files; and
transmitting, via a network and after receiving a request associated with the source media file, a first derivative media file selected based on the plurality of third database entries.

22. The method of claim 21, wherein the transmitting comprises streaming, via the network and to a second computing device, the first derivative media file.

23. The method of claim 21, further comprising:
determining, based on at least one of the plurality of second database entries, to transcode the source media file according to an alternative format; and
transcoding, prior to the transmitting and based on the determining, the source media file according to the alternative format.

* * * * *

UNITED STATES PATENT AND TRADEMARK OFFICE
CERTIFICATE OF CORRECTION

| | |
|---|---|
| PATENT NO. | : 10,079,869 B2 |
| APPLICATION NO. | : 14/334744 |
| DATED | : September 18, 2018 |
| INVENTOR(S) | : Ramaley et al. |

It is certified that error appears in the above-identified patent and that said Letters Patent is hereby corrected as shown below:

In the Specification

Column 2, Line 22:
Please delete "Real Player" and insert --Real Player®--

Column 3, Line 12:
Delete "In," and insert --In--

Column 6, Line 6:
Delete "files," and insert --files--

Column 8, Line 19:
Delete "link" and insert --Web--

Column 9, Line 1:
Delete "provider," and insert --provider--

Column 11, Line 36:
Delete "representative-database" and insert --representative database--

Column 12, Line 5:
Delete "FIG. 93" and insert --Fig. 9B--

Column 12, Lines 54-55:
Delete "http://serviceprovider.com/3248974773455" and insert
--http://serviceprovider.com/324897473455--

Column 12, Line 59:
Delete "media," and insert --media--

Signed and Sealed this
Ninth Day of April, 2019

Andrei Iancu
*Director of the United States Patent and Trademark Office*

CERTIFICATE OF CORRECTION (continued)
U.S. Pat. No. 10,079,869 B2

Column 14, Line 37:
Delete "Terran-Interactive®" and insert --Terran Interactive®--

Column 15, Line 50:
Delete "a-network" and insert --a network--

Column 16, Line 49:
After "9A-9C,", delete "¶02767"

Column 16, Line 51:
Delete ""http://serviceprovided.com/3248974?3455."" and insert --"http://serviceprovided.com/3248974?3455,"--

Column 16, Line 61:
Delete "in the in the" and insert --in the--

Column 17, Line 4:
Delete "Alternatively;" and insert --Alternatively,--

Column 17, Line 17:
Delete "FIG." and insert --FIGS.--